United States Patent
Fischer et al.

[11] Patent Number: 6,075,617
[45] Date of Patent: Jun. 13, 2000

[54] BANNER PAGE DETECTION AND HANDLING MECHANISM

[75] Inventors: Todd A. Fischer; John L. Boldon, both of Boise, Id.

[73] Assignee: Hewlett-Packard Company, Palo Alto, Calif.

[21] Appl. No.: 08/974,745

[22] Filed: Nov. 19, 1997

[51] Int. Cl.[7] ................................................. G06K 15/00
[52] U.S. Cl. ........................................ 358/1.16; 358/1.13
[58] Field of Search ..................................... 395/117, 115, 395/101, 109, 113; 399/382; 358/400, 401, 402, 404, 443, 444, 468, 1.1, 1.9, 1.13, 1.14, 1.16, 1.18, 1.15

[56] References Cited

U.S. PATENT DOCUMENTS

| | | | |
|---|---|---|---|
| 5,504,843 | 4/1996 | Catapano et al. | 395/115 |
| 5,513,013 | 4/1996 | Kuo | 358/448 |
| 5,547,178 | 8/1996 | Costello | 270/52.02 |
| 5,644,685 | 7/1997 | Baehr | 395/111 |
| 5,659,164 | 8/1997 | Schmid et al. | 235/375 |
| 5,704,602 | 1/1998 | Taylor et al. | 270/1.02 |
| 5,709,374 | 1/1998 | Taylor et al. | 270/1.02 |
| 5,710,874 | 1/1998 | Bergen | 395/115 |
| 5,715,381 | 2/1998 | Hamilton | 395/114 |
| 5,762,329 | 6/1998 | Nakazato et al. | 270/58.09 |
| 5,869,824 | 2/1999 | Okada et al. | 235/380 |

*Primary Examiner*—Arthur G. Evans
*Attorney, Agent, or Firm*—Lane R. Simmons

[57] ABSTRACT

An image forming device comprises an input for receiving a print job data stream; a memory coupled to the input for storing at least a portion of the print job data stream; and, detection apparatus coupled to the memory for detecting indicia indicative of a banner page within the at least a portion of the print job data stream. The indicia includes, selectively, a job boundary, a printer description language used, a page size, complexity of a page, a page closing, a differentiation of print settings as between consecutive pages, or any combination thereof. The image forming device further includes management apparatus coupled to the detection apparatus for managing usage of the banner page in the image forming device, including controlling resolution of the banner page, controlling inclusion/exclusion of the banner page in finishing operations, controlling output quantity of the banner page, and controlling input and output tray selection for the banner page. Controlling the resolution of the banner page includes optimizing its resolution such that throughput of multiple print jobs in the image forming device is enhanced.

30 Claims, 4 Drawing Sheets

BANNER PAGE DETECTION AND HANDLING MECHANISM

FIELD OF THE INVENTION

This invention relates in general to image forming devices and, more particularly, to improved management of print job banner pages.

BACKGROUND OF THE INVENTION

Banner pages have long been associated with print jobs in shared print environments. A banner page is, typically, a printed sheet that separates one print job output from another. For example, a banner page may include the name or some other uniquely identifying feature of the user that submitted the print job, often in an eye-catching format, so that the user can easily find and separate his/her print job from the other jobs in the printer's output tray.

Traditionally, the use of banner pages has been relatively narrow in scope and purpose, reflecting the capabilities and intended use of the shared printers. For example, one banner page has typically been output on top of (or in association with) each print job submitted. If multiple copies of a particular job are requested, then multiple banner pages may also be produced. Essentially, the only option available has been whether to print the banner page with the job, or not. And, often, even that option is not adjustable by the user because it is pre-designed at the shared print server that spools the print job to the printer.

However, as technology has enabled more sophisticated printers, offering greater printing capabilities and document finishing options, the need for variations on managing the traditional banner page in connection with those print jobs has also increased. For example, certain higher end shareable printers now enable enhanced printing, known as multiple original copying (MOPYing), whereby a single print job is sent once to the printer yet printed multiple times and output in proper order as multiple copies of a "single" job. Additionally, extensive finishing operations, such as collation, binding, stapling and punching are now offered. Furthermore, some printers provide multi-resolution print capability so that a job may be printed in one of a selection of print resolution modes. In sum, these printers provide advanced shared printing, "copying", and selective document finishing functionality all in one.

To this regard, the options for using banner pages has not kept up with the sophisticated options of these printers. For example, if a single MOPY job is submitted with a request for a banner page, and the MOPY job is designated to produce three collated sets of one document, then each set would include a banner page for a total of three banner pages. Additionally, if each set is stapled, then each banner page would also be stapled to its respective document set. In this example, the output of three banner pages for the single MOPY job not only increases total print throughput time, but is resource wasteful and may not be desired by the user or necessary for identifying the single MOPY job. In other words, a single banner page for the single MOPY job may suffice but is not available. Moreover, the stapling of each banner page to each set is a further inconvenience to the user who usually discards the banner page. In this scenario, it may be more convenient to have the collated sets stapled, but not the banner page. Rather, the banner page could simply be placed unattached adjacent to the first (or last, depending on print output order) stapled document set. Additionally, in a multi-resolution capable printer, it would be beneficial if the banner page could be printed at a lower resolution to increase overall printer processing throughput in the event a subsequent print job is also to be printed at the lower resolution.

However, conventionally, it has not been easy to identify a banner page in a print job data stream that has been input to a printer from a host. As such, none of these improved banner page features are available in today's shared printer environments. This is due, in part, because in modern network printing environments the network printer may receive print data streams from multiple hosts, each of which may treat banner pages differently. Additionally, neither the conventional printer description language (PDL) commands nor the printer job language commands (PJL) explicitly define or identify a banner page as a banner page. When a print job is submitted to a shared printer, whether it is submitted using a PDL such as PCL or PostScript, or whether it is submitted as a raster image such as in a Sleek environment, the print job is typically enveloped with PJL commands for further controlling and defining the printing environment (or at least a default printing environment). If the host (whether it be a local host directly connected to a printer, or a print server host that has received the print job from a remote host) from which the print job is submitted is configured to attach a banner page to the print job (the banner page usually being defined with PDL commands), then in addition to enveloping the originally submitted print job with PJL commands, the banner page is also enveloped in PJL commands. Then both the banner page and the print job are entirely and jointly enveloped in outer PJL commands to effectuate a "single" PJL envelope defining a "single" print job. Within the "single" outer PJL envelope that defines the "single" print job are the sub-nested PJL command envelopes that separate and define the banner page (PDL commands) from the actual document print job (PDL commands). However, again, neither the PDL commands nor the PJL commands nor the enveloping scheme provide any specific mechanism for notifying the printer that a banner page is included. The printer sees an interpretable print job data stream, including, for example, PDL commands enveloped in PJL commands, but nothing that explicitly says "these PDL commands define a banner page" or "this PJL envelope identifies a banner page".

Thus, the difficulty of identifying a banner page associated with a print job data stream, in addition to the increasingly sophisticated print options being made available on newer shared printers, has notably left banner page management options lacking in today's printing environments.

Accordingly, an object of the present invention is to provide improved banner page management options, especially for shared and sophisticated printing environments.

SUMMARY OF THE INVENTION

According to principles of the present invention in a preferred embodiment, an image forming device comprises an input for receiving a print job data stream; a memory coupled to the input for storing at least a portion of the print job data stream; and, detection apparatus coupled to the memory for detecting at least two indicia indicative of a banner page within the portion of the print job data stream. The indicia includes, selectively, a job boundary, a printer description language used, a page size, complexity of a page, a page closing, a differentiation of print settings as between consecutive pages, or any other indicia that at least suggests the existence of a banner page, or any combination thereof.

The image forming device further includes management apparatus coupled to the detection apparatus for managing usage of the banner page in the image forming device, including controlling resolution of the banner page, controlling inclusion/exclusion of the banner page in finishing operations, controlling output quantity of the banner page, and controlling input tray selection and output tray designation for the banner page. Controlling the resolution of the banner page includes optimizing its resolution such that throughput of multiple print jobs in the image forming device is enhanced.

Other objects, advantages, and capabilities of the present invention will become more apparent as the description proceeds.

DETAILED DESCRIPTION OF THE INVENTION

Figure 1:
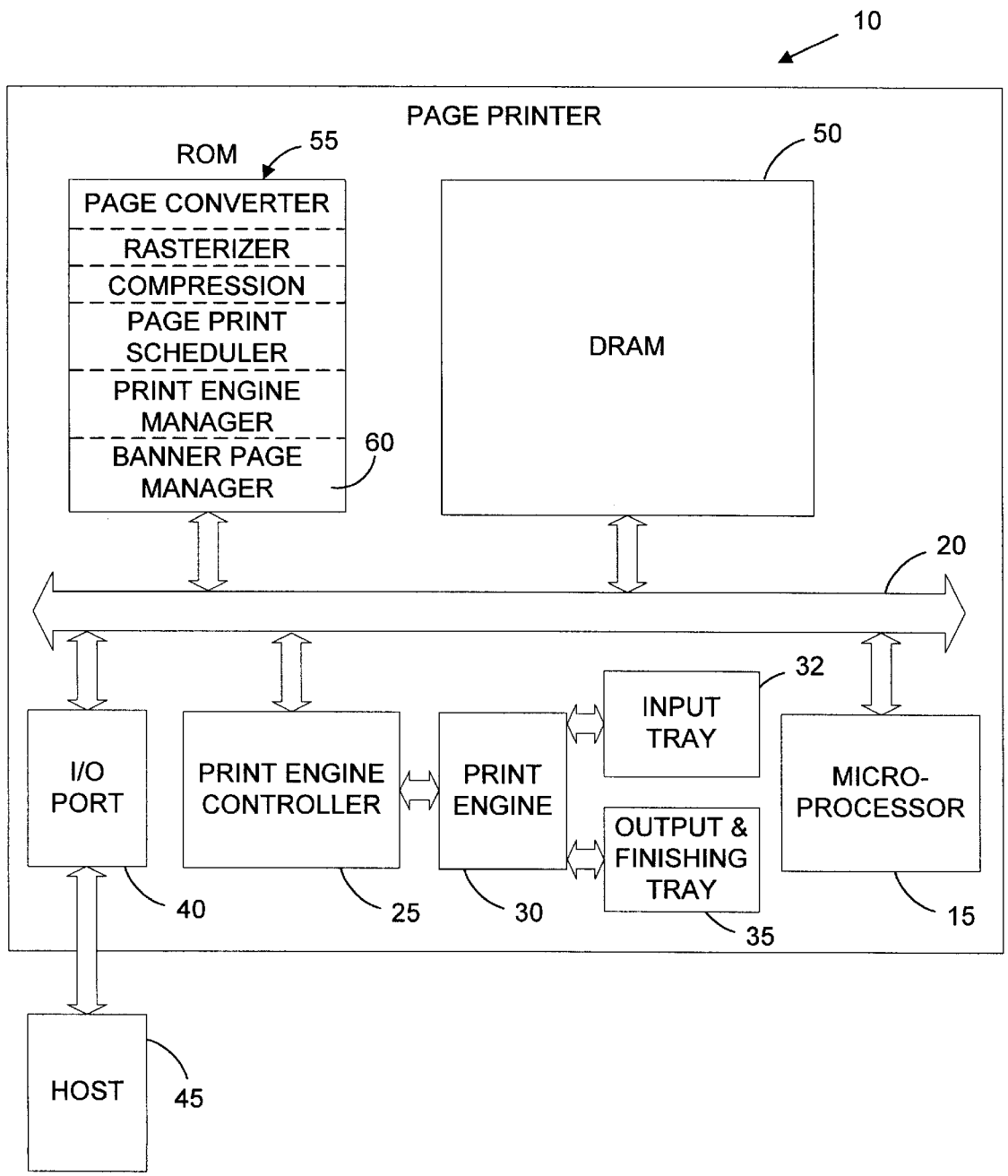
FIG. 1 is a block diagram of a printer embodying the present invention banner page detection and handling mechanism.

FIG. 1 is a high level block diagram of a page printer 10 incorporating the present invention banner page detection and management mechanism. Page printer 10 is controlled by a microprocessor 15 which communicates with other elements of the system via bus 20. A print engine controller 25 and associated print engine 30 connect to bus 20 and provide the print output capability for the page printer. Sheet media is pulled from input tray 32 into print engine 30 and directed to output and finishing tray 35. In a preferred embodiment, output and finishing tray 35 includes, for example, finishing feature mechanisms such as sheet registration, binding, stapling, punching, and the like, and may include one or more bins for collation or "mailbox" usage purposes. Input tray 32 may also include one or more input trays for media selection.

Also in a preferred embodiment, print engine 30 is a multi-resolution capable engine. For example, it can print, selectively, at 600 or 1200 dots per inch (dpi). For purposes of this disclosure, print engine 30 is a laser printer that employs an electrophotographic drum imaging system, as well known in the art. However, as will be obvious to those of ordinary skill in the art, the present invention is similarly applicable to other types of printers and/or imaging devices including, for example, inkjet printers, facsimile machines, copiers, or the like.

An input/output (I/O) port 40 provides communications between the page printer 10 and a host computer 45 and receives page descriptions (or raster data) from the host for processing within the page printer. A dynamic random access memory (DRAM) 50 provides a main memory for the page printer for storing and processing a print job data stream received from host 45. A read only memory (ROM) 55 holds firmware which controls the operation of microprocessor 15 and page printer 10. The code procedures stored in ROM 55 may include a page converter, rasterizer, compression code, page print scheduler and print engine manager. The page converter firmware converts a page description received from the host to a display command list, with each display command defining an object to be printed on the page. The rasterizer firmware converts each display command to an appropriate bit map (rasterized strip) and distributes the bit map into memory 50. The compression firmware compresses the rasterized strips in the event insufficient memory exists in memory 50 for holding the rasterized strips.

In general, the operation of page printer 10 commences when it receives a page description from host computer 45 via I/O port 40 in the form of a print job data stream. The page description is placed in DRAM 50. Microprocessor 30 accesses the page description, line by line, and builds a display command list using the page converter firmware in ROM 55. As the display command list is being produced, the display commands are sorted by location on the page and allocated to page strips in memory 50. When a page is closed for processing (i.e., all strips have been evaluated, rasterized, compressed, etc. for processing by print engine 30) then the rasterized strips are passed to print engine 30 by print engine controller 25, thereby enabling the generation of an image (i.e., text/graphics etc). The page print scheduler controls the sequencing and transferring of page strips to print engine controller 25. The print engine manager controls the operation of print engine controller 25 and, in turn, print engine 30.

ROM 55 further includes a banner page manager procedure 60 for banner page detection and handling according to the present invention. Banner page manager 60 parses at least a portion of the print job data stream stored in DRAM 50 to detect indicia indicative of a banner page. The indicia detected includes, preferably, at least two criteria, such as, selectively, a job boundary, a printer description language (PDL) used, a page size, complexity of a page, a page closing, a differentiation of print settings as between consecutive pages, or any combination thereof. The detection of each or any of these indicia is accomplished using conventional means. For example, a job boundary is detected by identifying conventional PJL commands indicative of the same. Similarly, the PDL language, page size and page closing are identifiable by the known PDL commands. A differentiation of print settings as between consecutive pages may include, selectively, differences in resolution, printer description language used, color, input bin selection, output bin destination, or finishing operations selected (such as binding, stapling or punching). Complexity of a page may be identified by evaluating how much text versus how much graphical image exists on the page.

Figure 2:
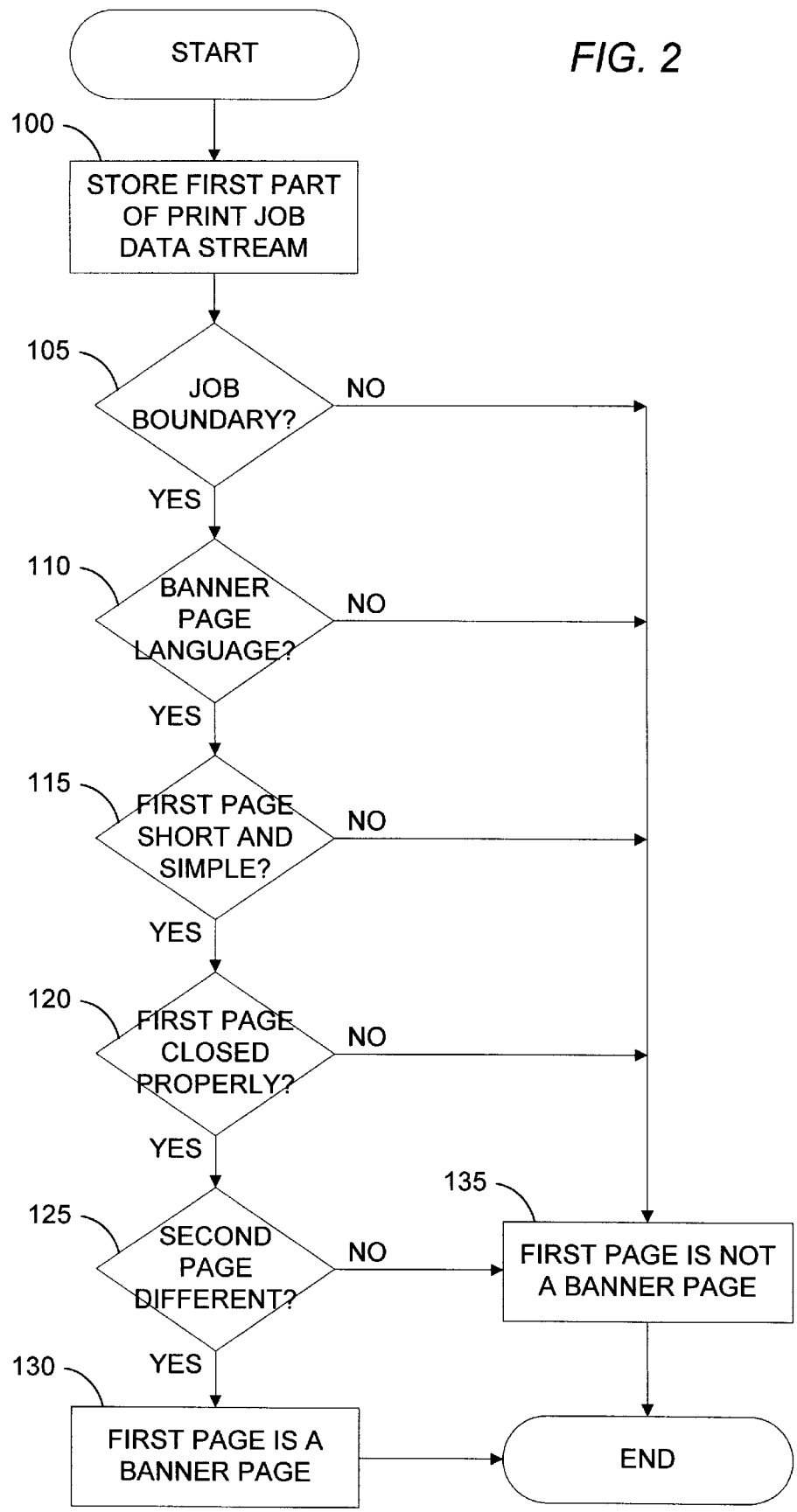
FIG. 2 is a flow chart depicting a preferred method for determining whether or not a banner page exists in a print job data stream.

In any case, the present invention banner page manager 60 captures at least two of the indicia and evaluates it to determine whether or not a banner page exists in the data stream. For example, referring now to FIG. 2, a flow chart depicts a preferred method for assessing the criteria previously discussed for determining whether or not a banner page exists in a print job data stream. First, 100, at least a portion of the data stream is stored in memory 50 or some other cache memory, sufficient to capture what may be a banner page. This stored portion will be termed herein as the lead portion. Since banner pages are usually small, the first 30K bytes are stored (in one embodiment) prior to generating the display list. Alternatively, the display list is generated and stored as normally occurs. In either case, determination of whether or not a banner page exists occurs with respect to the stored lead portion.

Next, at least two of the various evaluations previously discussed are made upon the lead portion of the data stream. Specifically, for example, if a matching print job boundary is detected 105, then we have at least one complete first page within the lead portion, indicative of a possible banner page. The identification of a PDL language 110 may also be indicative of a banner page. If the first page is short and simple 115 (for example, less than 25 K bytes and consists of text and not graphics commands) and if it is closed properly 120 (i.e., with a proper PDL command), these criteria further suggest the existence of a banner page. In addition to the forgoing criteria, if a second page is detected within the lead portion and it has print settings that are different 125 from those of the first page, then it is highly likely that the first page is a banner page 130. Otherwise, if any of the criteria are not satisfied, then the first page is not a banner page 135. Although these steps reflect one preferred method for detecting the banner page, it will be obvious to those of ordinary skill in the art that variations in the criteria evaluated and/or thresholds used in the evaluations performed might also suggest and/or identify the existence of a banner page according to principles of the present invention.

Once the banner page is identified in the print job data stream, the present invention banner page manager 60 is then able to manage and control actual usage of the banner page with respect to the print job and/or print jobs submitted to printer 10. This includes, for example, controlling resolution of the banner page, controlling inclusion/exclusion of the banner page in finishing operations, controlling output quantity of the banner page, controlling input tray and/or output tray selection for the banner page, and other banner page usages with respect to printer 10.

Controlling the resolution of the banner page includes, for example, optimizing its resolution such that throughput of multiple print jobs in the printer is enhanced. Alternatively, controlling the resolution may include effectuating a "toner save" mode upon the banner page to reduce toner consumption.

Optimizing the resolution of the banner page includes forcing the resolution to depend upon analysis of a resolution of a last page of a previous print job and upon an analysis of a resolution of a second page of a current print job (assuming the first page is detected as a banner page). Typically, higher resolution pages take longer to print than lower resolution pages. Thus, since banner pages are normally a discarded item, they do not always need to be printed with the same high resolution as the rest of the print job. Therefore, to increase printer throughput, the present invention prints a banner page at a lower resolution than the rest of its associated print job, when it is optimal to do so, to increase the overall printer throughput.

Several factors affect the determination of what the optimal banner page resolution is for best print throughput. For example, a change in resolution may require the page pipeline to be flushed, and flushing requires waiting for all previously processed/printed pages to drop into the appropriate output bin before starting printing of the next page. In a high end printer, multiple pages can be in the pipeline at one time, thus causing a significant amount of delay time before flushing is complete. Additionally, a change in resolution also typically requires a memory reconfiguration and a loss of font cache, both of which can also reduce overall print throughput. Thus, given these considerations, a banner page is printed at a lower resolution only when it is optimal to do so.

For example, referring now to the following Table 1, a matrix identifies an optimal resolution for a current banner page relative to a previous print job. In this example, it is assumed printer 10 is at least 600 and 1200 dpi resolution capable. As such, in exemplary configuration "A", if the last page of a previous job is at 600 dpi, and the second page (assuming the first page is a banner page) of the current job (or, it could be said, next job) is also at 600 dpi, then the optimum banner page resolution is also 600 dpi. Thus, in this instance, the resolution of the current banner page is already at the optimum resolution and no changes need occur. However, in configuration "B", if the last page of a previous job is at 600 dpi, and the second page of the current job is at 1200 dpi, then the optimum banner page resolution is at 600 dpi. Thus, in this instance, the banner page of the current print job is printed at 600 dpi, similar to that of the previous print job, and only then is the rest of the current print job printed at its originally designated 1200 dpi. In effect, the change in resolution to 1200 dpi is delayed thereby presenting an improvement in overall throughput performance. In configuration "C", if the last page of the previous job is at 1200, and the second page of the current job is at 600, then the optimum banner page resolution is 600. Finally, in configuration "D", if the last page of the previous job is at 1200, and the second page of the current job is at 1200, then the optimum banner page is also 1200. No change is needed to optimize the printer throughput. In fact, a change at this point might cause overall throughput to be slowed because of the required time necessary to flush the pipeline, reconfigure the memory, and change the font sizing. Any benefit that would be obtained by printing the banner at a lower resolution than the previous and current print jobs is offset by the detriment incurred to change the resolution. Thus, the resolution is not changed in example "D".

TABLE 1

| Exemplary Configuration | Last Page of Previous Job | Second Page of Current Job | Optimum Banner Page Resolution |
|---|---|---|---|
| A | 600 | 600 | 600 |
| B | 600 | 1200 | 600 |
| C | 1200 | 600 | 600 |
| D | 1200 | 1200 | 1200 |

Figure 3:
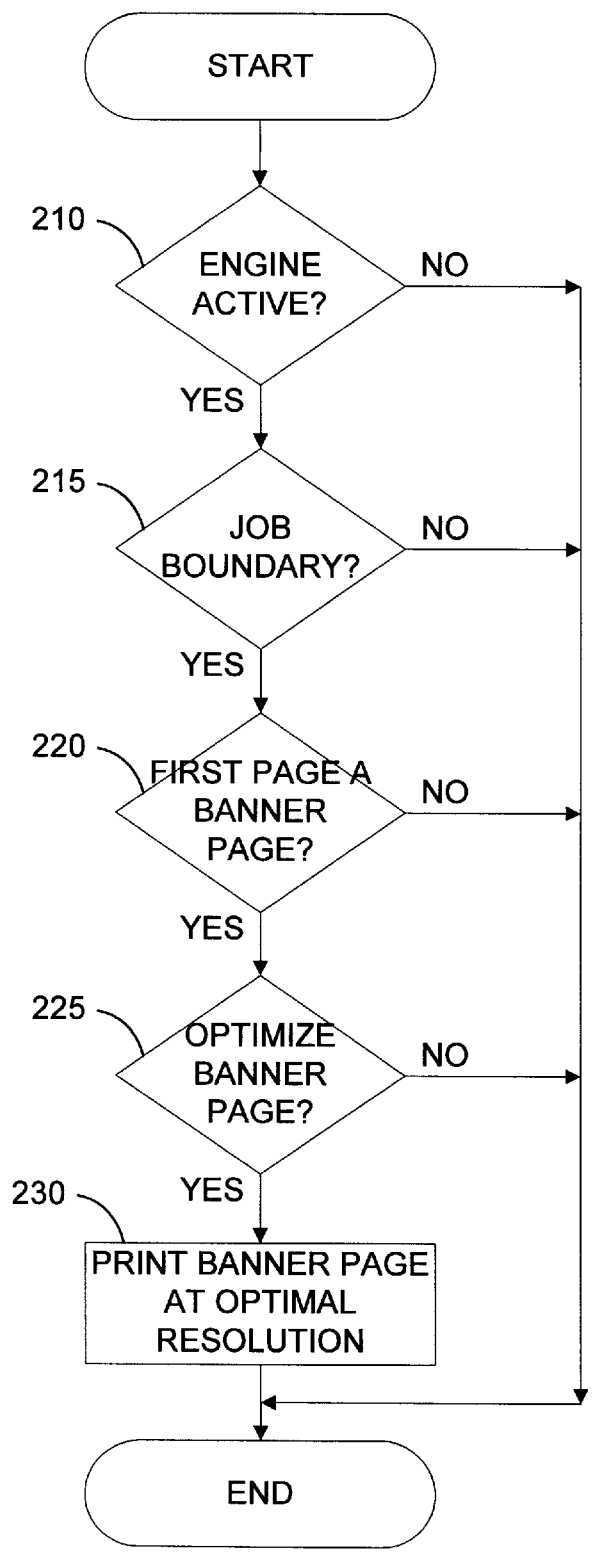
FIG. 3 is a flow chart depicting a preferred method for optimizing banner page resolution.

Referring now to FIG. 3, a flow chart depicts a preferred method for printing a banner page at optimal resolution as described in reference to Table 1. Specifically, if the engine is active 210 (for example, if a page is currently moving through the printer), and a job boundary is detected 215, and the first page is a banner page 220 (see FIG. 2) that needs to be optimized 225 (see Table 1), then the current banner page stored in memory 50 (or some other cache) is printed at the optimal resolution. Otherwise, if these criteria are not met, but there is a banner page, then it is printed at the default resolution dictated by the print job with which it is associated. No further optimizing need occur.

Figure 4:
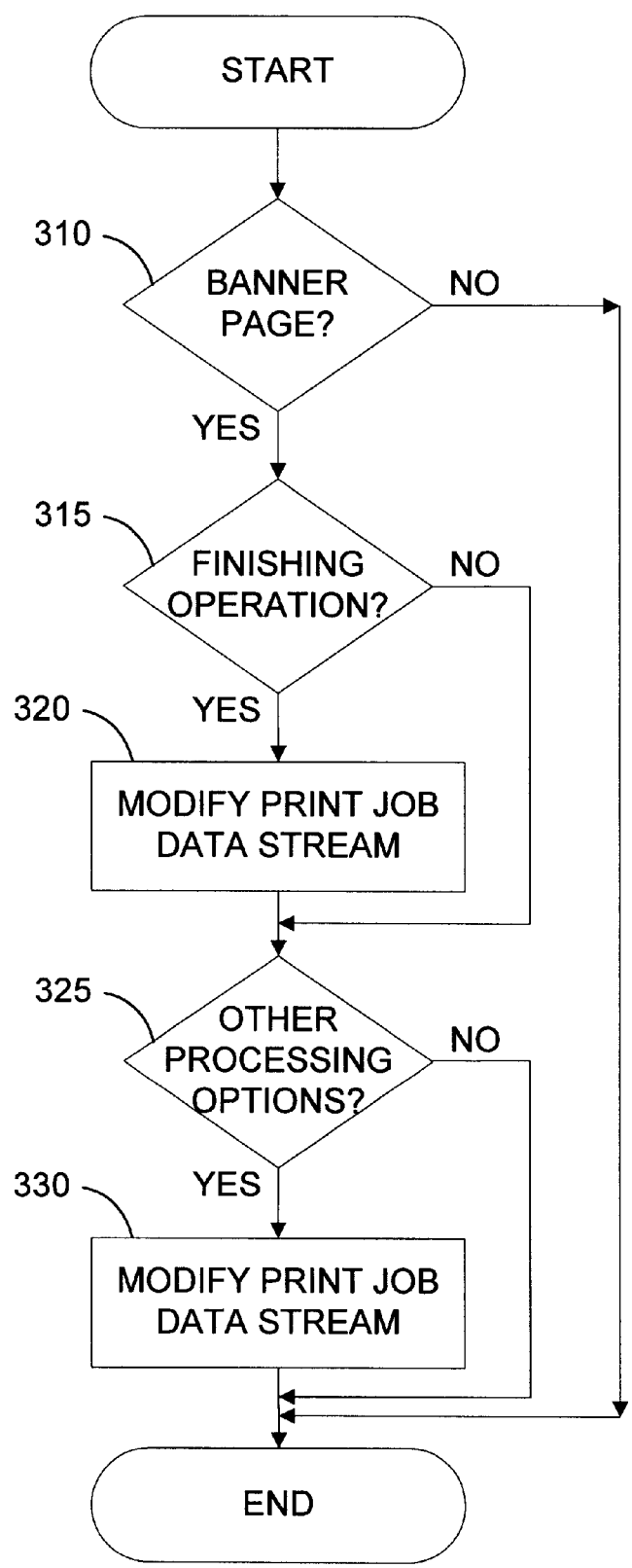
FIG. 4 is a flow chart depicting a preferred method for managing usage of a banner page.

Referring now to FIG. 4, a flowchart depicts a preferred method for managing usage of the banner page with respect to finishing operations and other processing options. Once the banner page is detected 310, the print job data stream is further parsed (either subsequent to or substantially simultaneously with the parsing and detecting of the banner page) by banner page manager 60 to detect finishing operations commands 315, such as registering, stapling, binding, punching, output tray designation, or other processing features 325 such as output tray or output quantity designation. In the event, for example, a finishing operation stapling command is detected for the job (typically within the PJL commands), then the stapling operation is controlled (or modified) 320 such that the banner page is not stapled to the rest of the output set of the print job. Namely, as an example, if the print job includes ten pages (i.e., in a document sub-job) plus a banner page (i.e., in a banner page sub-job), then the ten pages are stapled together, but the banner page is not stapled to the ten pages. One method for accomplishing this is to insert (or delete) appropriate PJL commands or PDL commands in the print job data stream at proper locations as obvious to those of ordinary skill in the art. As an example, this might include inserting a PJL command at the end of the banner page sub-job, or at the beginning of the document sub-job, that directs the stapling output tray to pass (or drop) the banner page into the final job-completed output tray. Thus, only the ten page document sub-job is stapled in the stapling tray before being passed to the final job-completed output tray.

As an alternative to modifying the PJL/PDL commands for controlling usage of the banner page, the display list that is produced from the parsing of the print job data stream may also be acted upon or modified as obvious to those of ordinary skill in the art. In either case, or regardless of any other method used, the ultimate result is enhanced control and usage of the banner page under principles of the present invention.

In reference now to banner page manager 60 controlling other processing features 325, such as input tray selection, output tray designation, or output quantity for the banner page, this is enabled similar to that of controlling finishing operations as previously discussed. For example, the output quantity of the banner page may be limited to a single output in the event a print job is output as a multiple original copy print job (or, simply, as multiple copies). Specifically, if a MOPY job is submitted to produce multiple original prints (sets), then rather than printing the banner page with each set, the banner page is printed only once if all the sets are output ultimately to a single output tray 35. Or, as another example, in the context of output tray selection, the banner page (sub-job) may be controlled to follow the document (sub-job) to the selected output tray (i.e., whether it be a finishing tray, a final job-completed "mailbox" bin, a face-up tray, etc.). Again, in either case, these features are accomplished by modifying 330 the print job data stream (either before or after display list generation) at proper locations with appropriate commands. For example, before the display list is generated, PJL commands may be inserted into the banner page sub-job that designates the destination of the banner page to be a particular mailbox bin.

Finally, what has been described are preferred embodiments for a banner page detection and handling mechanism and method. It will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. An image forming device, comprising:
   (a) an input for receiving a print job data stream;
   (b) a memory coupled to the input for storing at least a portion of the print job data stream; and,
   (c) detection apparatus coupled to the memory for detecting at least two indicia indicative of a printable banner page within the portion of the print job data stream, wherein at least one of the indicia includes complexity of a page defined including a text versus vector or graphical image comparative analysis.

2. The image forming device of claim 1 wherein the detection apparatus comprises software, firmware or circuitry, or any combination thereof.

3. The image forming device of claim 1 wherein the indicia includes, selectively: a job boundary, a printer description language used, a page size, complexity of a page, a page closing, a differentiation of print settings as between consecutive pages, or any combination thereof.

4. The image forming device of claim 3 wherein the print settings include, selectively: resolution, printer description language used, color, input bin selection, output bin destination, or finishing operations selected.

5. The image forming device of claim 4 wherein the finishing operations include registering, binding, stapling or punching.

6. The image forming device of claim 1 further including management apparatus coupled to the detection apparatus for managing usage of the banner page in the image forming device.

7. The image forming device of claim 6 wherein the management apparatus comprises software, firmware or circuitry, or any combination thereof.

8. The image forming device of claim 6 wherein managing usage of the banner page includes, optionally, controlling resolution of the banner page, controlling inclusion/exclusion of the banner page in finishing operations, controlling input or output tray selection, and controlling output quantity of the banner page.

9. An image forming device, comprising:
   (a) an input for receiving a print job data stream;
   (b) a memory coupled to the input for storing at least a portion of the print job data stream;
   (c) detection apparatus coupled to the memory and configured to detect at least two indicia indicative of a printable banner page within the portion of the print job data stream; and
   (d) management apparatus coupled to the detection apparatus and configured to manage usage of the banner page in the image forming device including optimizing its resolution such that throughput of multiple print jobs in the image forming device is enhanced.

10. The image forming device of claim 9 wherein optimizing the resolution of the banner page includes forcing the resolution to depend upon analysis of a resolution of a portion of a previous print job and a portion of a current print job.

11. The image forming device of claim 8 wherein the finishing operations include registering, binding, stapling, or punching.

12. The image forming device of claim 8 wherein controlling the output quantity of the banner page includes limiting the output quantity of the banner page to a single output in the event a print job is output as a multiple original copy print job.

13. A method of detecting a banner page associated with a print job data stream in an image forming device, comprising:
   (a) reading at least a portion of the print job data stream; and,
   (b) detecting at least two indicia indicative of a printable banner page within the at least a portion of the print job data stream, wherein at least one of the at least two indicia includes, selectively, a job boundary, a printer description language used, a page size, complexity of a page, a page closing, or a differentiation of print settings as between consecutive pages, and wherein complexity of a page is defined including a text versus vector or graphical image comparative analysis.

14. The method of claim 13 wherein the print settings include, selectively: resolution, printer description language used, color, input bin selection, output bin destination, or finishing operations selected.

15. The method of claim 13 further including managing usage of the banner page in the image forming device, including usage differentiated from enabling an output of a single banner page for each single copy output of a print job.

16. The method of claim 15 wherein managing usage of the banner page includes, optionally, controlling: resolution of the banner page, inclusion/exclusion of the banner page in finishing operations, output tray selection, and output quantity of the banner page.

17. A method of managing a banner page associated with a print job data stream in an image forming device, comprising:
   (a) reading at least a portion of the print job data stream;
   (b) detecting at least two indicia indicative of a printable banner page within the at least a portion of the print job data stream, wherein at least one of the at least two indicia includes, selectively, a job boundary, a printer description language used, a page size, complexity of a page, a page closing, or a differentiation of print settings as between consecutive pages; and,
   (c) managing usage of the banner page in the image forming device including controlling resolution of the banner page, and wherein controlling resolution of the banner page includes forcing the resolution to depend upon analysis of a resolution of a portion of a previous print job and a portion of a current print job.

18. The method of claim 16 wherein the finishing operations include stapling, binding and punching.

19. A method of managing a banner page associated with a print job data stream in an image forming device, comprising:

(a) reading at least a portion of the print job data stream;

(b) detecting at least two indicia indicative of a printable banner page within the at least a portion of the print job data stream, wherein at least one of the at least two indicia includes, selectively, a job boundary, a printer description language used, a page size, complexity of a page, a page closing, or a differentiation of print settings as between consecutive pages; and, (c) managing usage of the banner page in the image forming device, including limiting the output quantity of the banner page to a single output in the event a print job is output as a multiple original copy print job.

20. A computer-readable medium having computer-executable instructions for performing steps in the method recited in claim 13.

21. An image forming device, comprising:

(a) an input for receiving a print job data stream;

(b) a memory coupled to the input for storing at least a portion of the print job data stream;

(c) detection apparatus coupled to the memory for detecting indicia indicative of a printable banner page within the portion of the print job data stream; and, (d) management apparatus coupled to the detection apparatus for managing usage of the banner page independent of other pages defined in the print job data stream including controlling resolution of the banner page such that throughput of multiple print jobs in the image forming device is enhanced.

22. The image forming device of claim 21 wherein managing usage of the banner page includes controlling inclusion/exclusion of the banner page in finishing operations.

23. The image forming device of claim 21 wherein managing usage of the banner page includes controlling input/output tray selection for the banner page.

24. An image forming device, comprising (a) an input for receiving a print job data stream;

(b) a memory coupled to the input for storing at least a portion of the print job data stream;

(c) detection apparatus coupled to the memory for detecting indicia indicative of a printable banner page within the portion of the print job data stream; and, (d) management apparatus coupled to the detection apparatus for managing usage of the banner page independent of other pages defined in the print job data stream including controlling output quantity of the banner page.

25. An image forming device, comprising:

(a) an input for receiving a print job data stream;

(b) a memory coupled to the input for storing at least a portion of the print job data stream;

(c) detection apparatus coupled to the memory for detecting indicia indicative of a printable banner page within the portion of the print job data stream; and, (d) management apparatus coupled to the detection apparatus for managing usage of the banner page independent of other pages defined in the print job data stream including controlling usage differentiated from enabling an output of a single banner page for each single copy output of a print job.

26. A method of managing a banner page associated with a print job data stream in an image forming device, comprising:

(a) reading at least a portion of the print job data stream;

(b) detecting a printable banner page within the at least a portion of the print job data stream; and, (c) managing usage of the banner page independent of other pages defined in the print job data stream in the image forming device including controlling resolution of the banner page such that throughput of multiple print jobs in the image forming device is enhanced.

27. The method of claim 26 wherein managing usage of the banner page includes controlling inclusion/exclusion of the banner page in finishing operations.

28. The method of claim 26 wherein managing usage of the banner page includes controlling input/output tray selection of the banner page.

29. A method of managing a banner page associated with a print job data stream in an image forming device, comprising:

(a) reading at least a portion of the print job data stream;

(b) detecting a printable banner page within the at least a portion of the print job data stream; and, (c) managing usage of the banner page independent of other pages defined in the print job data stream in the image forming device including controlling output quantity of the banner page.

30. A method of managing a banner page associated with a print job data stream in an image forming device, comprising:

(a) reading at least a portion of the print job data stream;

(b) detecting a printable banner page within the at least a portion of the print job data stream; and, (c) managing usage of the banner page independent of other pages defined in the print job data stream in the image forming device, including controlling usage differentiated from enabling an output of a single banner page for each single copy output of a print job.

* * * * *